United States Patent [19]
Gonzales

[11] Patent Number: 5,979,722
[45] Date of Patent: Nov. 9, 1999

[54] COMBINATION BACKPACK AND SPLASH GUARD FOR BICYCLE RIDER

[76] Inventor: Karen D. Gonzales, 137 Lowell Blvd., Denver, Colo. 80219

[21] Appl. No.: 09/002,570

[22] Filed: Jan. 3, 1998

Related U.S. Application Data

[60] Provisional application No. 60/034,415, Jan. 6, 1997.

[51] Int. Cl.[6] .............................. A45F 4/02; A45F 3/04; A41D 27/12
[52] U.S. Cl. .......................... 224/153; 224/576; 224/581; 224/650; 224/652; 224/640; 224/148.5; 2/46; 383/117; 359/519
[58] Field of Search .................................... 224/155, 153, 224/576, 577, 581, 650, 651, 653, 658, 652, 640, 148.5; 2/467, 46, 48; 297/4; 383/117; 359/516, 519

[56] References Cited

U.S. PATENT DOCUMENTS

| | | | |
|---|---|---|---|
| 2,324,194 | 7/1943 | Campiglia | 224/637 |
| 4,423,834 | 1/1984 | Rush | 224/153 |
| 4,669,127 | 6/1987 | Swanson | 2/46 |
| 5,529,229 | 6/1996 | Fier | 224/153 |
| 5,560,524 | 10/1996 | Brune | 224/155 |
| 5,570,824 | 11/1996 | Lyon et al. | 224/240 |
| 5,573,166 | 11/1996 | Leja | 224/651 |
| 5,584,422 | 12/1996 | Bond-Madsen | 224/155 |
| 5,624,065 | 4/1997 | Steffe | 224/148.7 |

FOREIGN PATENT DOCUMENTS

| | | | |
|---|---|---|---|
| 479442 | 2/1938 | United Kingdom | 224/209 |

*Primary Examiner*—Linda J. Sholl
*Attorney, Agent, or Firm*—Edwin H. Crabtree; Ramon L. Pizavvo; Donald W. Margolis

[57] ABSTRACT

A combination backpack and splash guard used by a bicycle rider. The combination is designed to protect the bicycle rider's clothing from water and mud during wet weather and when riding through water and mud puddles. Also, the backpack and splash guard provides for carrying various items when riding a bicycle. Further, the backpack and splash guard includes reflective material and/or reflective tape sewn thereon for providing greater visibility to approaching vehicles under dark conditions. The backpack and splash guard includes an outside waterproof back cover with adjustable reflective shoulder straps and waist straps. The shoulder straps and waist straps are used to secure the back cover to a back of a bike rider. An inside back cover, made of mesh material, is attached to a rear face of the outside back cover with a storage opening between the tops of the outside and inside covers. The storage opening is used for receiving different items therethrough and storing the items between the outside and inside covers. A waterproof splash guard cover is attached to a bottom of the outside cover and is suspended therefrom for covering a bicycle seat and the rider's seat. The splash guard cover is adjustably attached along a length of a front face of the outside back cover or the inside back cover also forming an additional storage pocket when splash protection is not required. The backpack and splash guard is made in various widths and lengths for children and adults who enjoy riding in the outdoors.

17 Claims, 2 Drawing Sheets

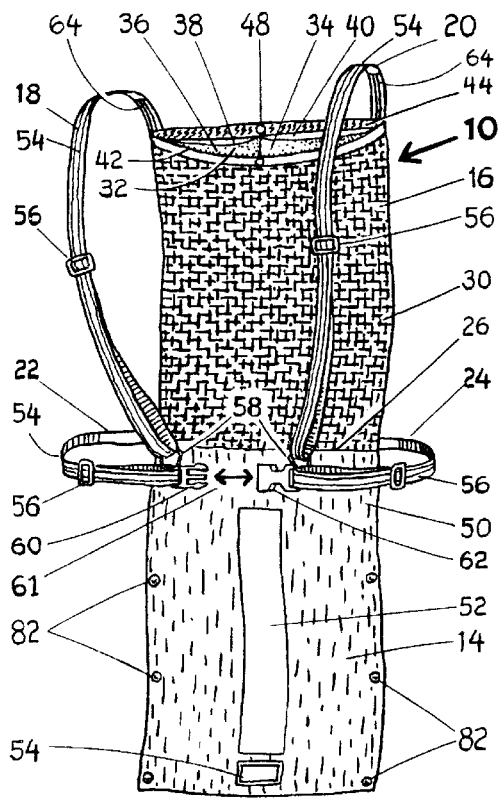
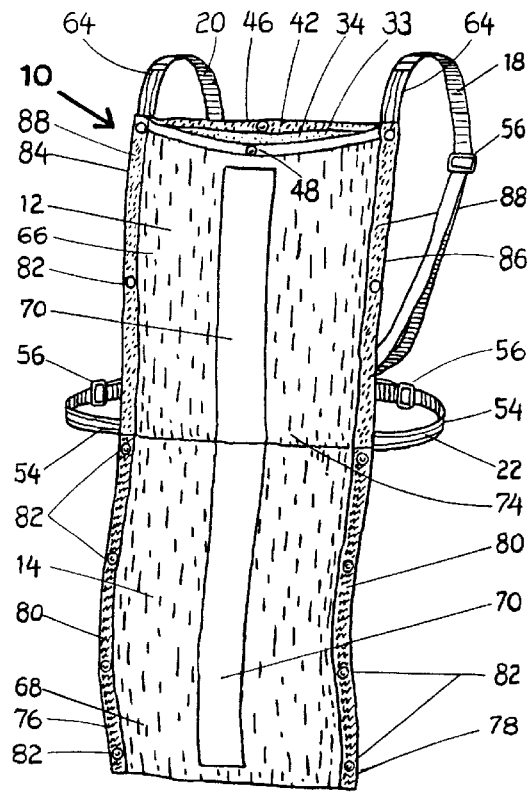
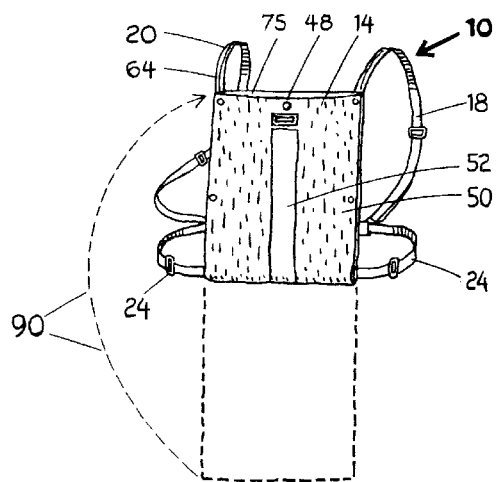
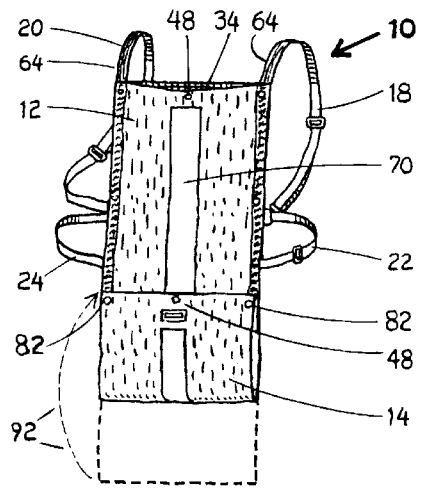
FIG. 1
FIG. 2
FIG. 3
FIG. 4

COMBINATION BACKPACK AND SPLASH GUARD FOR BICYCLE RIDER

This application claims the benefit of U.S. Provisional Application 60/034,415 filed on Jan. 6, 1997.

BACKGROUND OF THE INVENTION (a) Field of the Invention

This invention relates to seat covers, backpacks and like products and more particularly, but not by way of limitation, to a combination backpack and splash guard used by bicycle riders and others during outdoor activities such as walking, running, roller blading, motorcycle riding, etc.

(b) Discussion of Prior Art

With the proliferation of different types of bicycles for outdoor activities, many of today's bicycles do not have front and rear wheel fenders. The reason being, people wish to ride bikes that are lightweight, streamlined, strong and rugged in construction. Therefore, fenders have been eliminated on many of the new styles of mountain bikes, racing bikes, etc. Because many of today's popular bikes do not have fenders, a bike rider will be splashed on the seat and the back by a rear tire when riding through water and mud puddles and when riding in the rain.

In U.S. Pat. Nos. 3,185,362 to Wakefield and 5,003,634 to Brinkman, a foldable seat cover with belt and a combination seat-pack with belt are disclosed. In U.S. Pat. No. 5,241,707 to Neta, a seat warmer is described which can be converted into a muffler. In U.S. Pat. No. 4,689,829 to Kaplan, a seat cover for skiers is described which can be rolled onto a belt for storage. In U.S. Pat. No. 4,837,859 to Hamberg, a piece of supplementary clothing is shown which includes a lower pad for sitting on.

None of the above prior art patents related to seat covers, seat warmers and clothing disclose or teach the unique features, objects, advantages and clothing design of the subject combination backpack and splash guard for bicycle riders as described herein.

SUMMARY OF THE INVENTION

In view of the foregoing, it is a primary object of the subject invention to provide a combination backpack and splash guard used by a bicycle rider wherein the combination is designed to be made of waterproof or water resistant fabric that will protect the bicycle rider's clothing from water and mud during wet weather and when riding through water and mud puddles.

Another object of the backpack and splash guard is to provide storage pockets for conveniently carrying various sizes and shapes of items when riding a bicycle.

A further object of the invention is the combination is made of reflective material and/or light reflective tape sewn on a back cover and a splash guard cover along with reflective shoulder and waist straps for providing greater visibility to approaching vehicles under dark conditions and for providing increased safety for the rider.

Still another object is the splash guard cover can also be adjustably attached along a length of the outside back cover or the inside back cover forming an additional storage pocket when splash protection is no longer required.

Yet another object of the backpack and splash guard is the combination can be made in various sizes, widths and lengths for adults and children of different sizes.

Also, another object of the backpack and splash guard is it's ability to be rolled up neatly in a compact roll for storage around a bicycle seat post or other locations on the bicycle if not being used otherwise.

The backpack and splash guard includes an outside waterproof or water resistant reflective back cover with reflective shoulder straps and waist straps. The shoulder straps and waist straps are used to secure the back cover to a back of a bike rider. An inside back cover, which is made of mesh material, is attached to a rear face of the outside back cover with a storage opening between the top of the outside and inside covers. The storage opening is used for receiving different items therethrough and storing the items between the outside and inside covers. A waterproof splash guard cover is attached to a bottom of the outside cover and is suspended therefrom for covering a rider's seat if the rider sits on the splash guard cover. The splash guard cover is adjustably attached along a length of a front face or a rear face of the outside back cover and forms an additional storage pocket when splash protection is not required.

These and other objects of the present invention will become apparent to those familiar with backpacks, outdoor clothing, rain gear, bicycle clothing accessories and like products from the following detailed description, showing novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 1 is a perspective view of the combination backpack and splash guard showing a rear face of an outside back cover attached to an inside back cover made of mesh material. A waterproof splash guard cover is also shown attached to a bottom of the outside back cover and suspended therefrom.

FIG. 2 is a perspective view of the combination backpack and splash guard showing a front face of the outside back cover and a front face of the splash guard cover with a strip of light reflective tape disposed along the length of the outside back cover and splash guard cover.

FIG. 3 illustrates the splash guard cover folded upwardly and covering the front face of the outside back cover and attached thereto.

FIG. 4 illustrates the splash guard cover folded upwardly and attached to itself to adjust in length for splash protection for a shorter rider to sit on.

DESCRIPTION OF THE PREFERRED EMBODIMENTS

Figure 5:
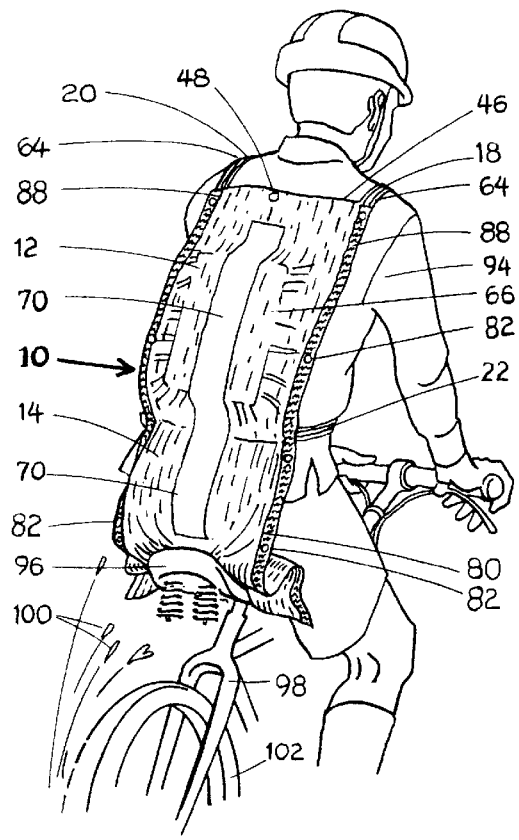
FIG. 5 illustrates the rear of a bicycle rider on a bike with combination backpack and splash guard in use with the outside back cover protecting the clothing on the back of the rider and the splash guard cover unfolded to protect the clothing on the seat of the rider as the rider sits on it as water drops are shown being splashed.

In FIG. 1, a perspective view of the subject combination backpack and splash guard is shown and having general reference numeral 10. Broadly the combination backpack and splash guard 10 includes an outside back cover 12, as seen in FIG. 2, a splash guard cover 14 suspended from and attached to the outside back cover 12, an inside back cover 16 attached to the outside back cover 12, a first reflective shoulder strap 18 and second reflective shoulder strap 20, a first reflective waist strap 22 and a second reflective waist strap 24. The outside back cover 12 and splash guard cover 14 are made of waterproof or water resistant fabric or may be made of reflective waterproof or water resistant material. The inside back cover 16 is made of a lightweight, net-like, stretching mesh material. The mesh material may allow air circulation, comfort and may offer expandability when in use for holding various items when held against the back of the bicycle rider.

The inside back cover 16 includes a bottom 26, a first side 28, a second side 30 attached to a rear face 33 of the outside back cover 12. The inside back cover 16 also includes an open top 32 providing a large pocket opening 34 for receiving various items for storage in a large pocket 36 formed between the inside back cover 16 and the outside back cover 12. Examples are the large pocket 36 can be used for storing a rain coat, extra warm clothing, water bottle, school books for a student, etc.

The rear face 33 of the outside back cover 12 also includes a pair of smaller pockets 38 and 40 sewn therein for holding small items such as sunscreen, a wallet, coins, insect repellant, facial tissue, etc. The opening 34 between the rear face 33 and the inside back cover 16 can be held closed to keep items from falling out by a hook fastener strip 42 attached to the open top 32. The hook fastener strip 42 is releasably secured to a loop fastener strip 44 attached to a top 46 of the rear face 33 of the inside back cover 16. Also metal or plastic snaps 48 may be used to further hold the large pocket opening 34 in a closed position when carrying various articles therein. Buttons rather than snaps can be used equally well.

A rear face 50 of the splash guard cover 14 includes a strip of reflective tape 52 sewn on the cover 14 for added protection for the bike rider when riding during dark hours and reflecting light from on coming vehicles. If the fabric itself is reflective, reflective tape is not necessary. The splash guard cover 14 can also include a label 54 with a brand name of "SPLASHPAC" on the label for identifying the subject backpack and splash guard 10.

The first and second shoulder straps 18 and 20 and the first and second waist straps 22 and 24 include reflective ribbon strips 54 along the length of the straps for added protection for the bike rider when approaching an on coming vehicle at night. The shoulder straps 18 and 20 and the waist straps 22 and 24 include sliders 56 attached to each strap for adjusting the length of the shoulder and waist straps when first placing the backpack and splash guard 10 thereon. Also the shoulder straps 18 and 20 may be connected to the waist straps 22 and 24 using metal or plastic attachment rings 58. Rather than the rings 58, plastic releasable hooks and similar type of fasteners can also be used equally well. The waist straps 22 and 24 are releasably joined together as indicated by arrow 61 using a male buckle fasteners 60 and a female buckle fastener 62 or plastic releasable hooks and similar types of fasteners can also be used equally well. It should be noted, the shoulder straps 18 and 20 also have attached to them an elastic strip portion 64 for allowing the straps 18 and 20 to flex during shoulder movement and help hold the straps 18 and 20 on the shoulders of the bike rider. The elastic strip portions 64 further provide for added shoulder comfort when the combination backpack and splash guard 10 is in use. The elastic strip portions 64 are also attached to the inside back cover 16.

In FIG. 2, a perspective view of the combination backpack and splash guard 10 is illustrated showing a front face 66 of the outside back cover 12 and a front face 68 of the splash guard cover 14 with a strip of light reflective tape 70 disposed along the length of the outside back cover 12 and splash guard cover 14 and centered thereon. Rather than light reflective tape 70, reflective fabric may be used on outside back cover 12 and the front and rear face of splash guard cover 14. It should be noted that a top 72 of the splash guard cover 14 is attached to the bottom 26 of the outside back cover 12 and integral thereto. The splash guard cover 14 is dimension to be wide enough and long enough to cover the seat of different size bike riders. For example, the splash guard cover 14 may have a width in a range of 10 inches to 14 inches and a length of 10 inches to 24 inches. Likewise, the outside back cover 12 may also have dimensions similar to the splash guard cover 14.

An important feature of the subject invention is the ability of the splash guard cover 14 to be folded upwardly along it's length and folded and releasably attached to itself or releasably attached to the outside back cover 12 or inside back cover 16 forming an additional storage pocket 75, when the splash guard cover 14 is not needed for protection. On opposite sides 76 and 78 of the splash guard cover 14 and along the length of the cover 14 are strips of loop fasteners 80. Also, the splash guard cover 14 can include snap fasteners 82 spaced along the length of the cover 14. Further, opposite sides 84 and 86 of the outside back cover 12 include strips of hook fasteners 88 along the length thereof for releasable engagement with the loop fasteners 80 of the splash guard cover 14. The outside back cover 12 can also include snap fasteners 82 spaced along the length of the cover 12. The hook and loop fasteners 88 and 80 provide for infinite adjustment and attachment of the splash guard cover 14 along the length of the outside back cover 14 and forming the additional storage pocket 75 when folded upwardly and attached.

While the hook and loop fasteners 88 and 80 and snap 82 are shown in the drawings, it can be appreciated that zippers can be used along with other types of fasteners equally well with the backpack and splash guard 10 and without departing from the spirit and scope of the invention.

In FIG. 3, the splash guard cover 14 is illustrated folded, as indicated by arrow 90 upwardly and covering the front face 66 of the outside back cover 12 and attached thereto. In this example the hook fasteners 88 engage the loop fasteners 80 along with the snaps 82 engaging each other. The hook and loop fasteners 88 and 80 can be used alone or the snaps 82 can be used or a combination of both. In this manner, the splash guard cover 14 is raised and attached to the outside back cover 12 when the bicycle rider no longer needs wet weather protection and when riding during dry conditions. It also forms the additional storage pocket 75 and if the rider gets off the bicycle, the rider's helmet can be held in the pocket.

In FIG. 4, the splash guard cover 14 is illustrated folded in half as indicated by arrow 92. In this example, the snaps 82 are used for engaging each other and allowing the folded splash guard cover 14 to be suspended from the outside back cover 12 to adjust in length to the size of the rider.

In FIG. 5, the rear of a bicycle rider 94 is illustrated sitting on a seat 96 of a bicycle 98. In this drawing, water 100 is shown being splashed upwardly from a back tire 102 and toward the back of the bicycle rider 94. The rider 94 is shown wearing the combination backpack and splash guard 10 with the outside back cover 12 protecting the clothing on the back of the rider 94 and the splash guard cover 14 unfolded and on top of the bike seat 96 for protecting the clothing on the seat of the rider 94. Note, the splash guard cover 14 is sufficient in length in order to sit on when sitting on the bicycle seat 96 and protect the clothing on the seat of the rider 94 from water and mud splashes.

Figure 6:
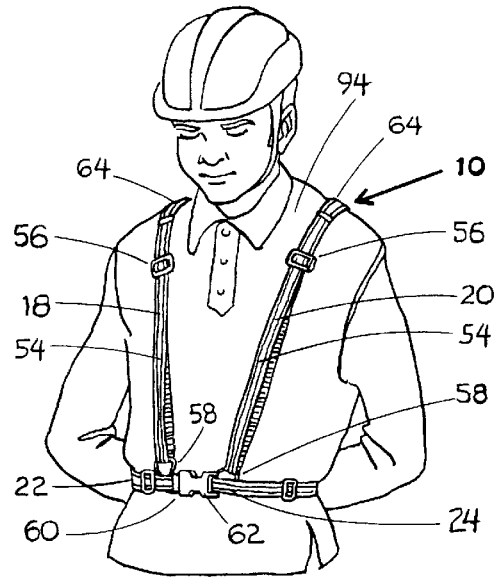
FIG. 6 illustrates the front of the bike rider with adjustable reflective shoulder straps received over the shoulders of the rider and adjustable reflective waist straps received around the waist of the rider.

In FIG. 6, a front of the bike rider 94 is shown with the adjustable reflective shoulder straps 18 and 20 received over the shoulders of the rider 94. Also, the adjustable reflective waist straps 22 and 24 are shown received around the waist of the rider 94 and attached using the buckle fasteners 60 and 62.

Figure 7:
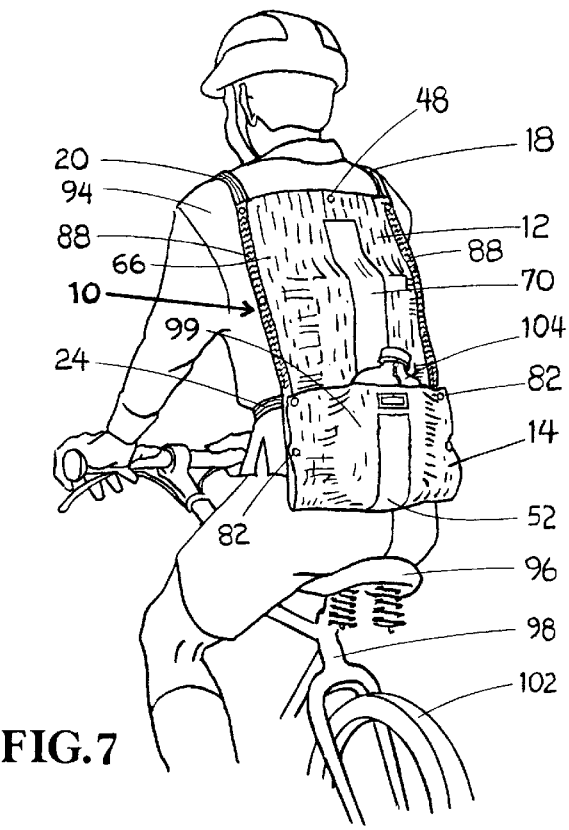
FIG. 7 illustrates the rear of the bicycle rider on the bike with the splash guard cover folded in half and attached to itself for forming a storage pocket and holding a water bottle therein.

In FIG. 7, the rear of the bicycle rider 94 is again shown and on the bike 98. In this view, the splash guard cover 14 has been folded in half and attached to itself or attached to the front face 66 of the outside back cover 12 forming an outside storage pocket 99 for holding a water bottle 104 or other items if desired.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A combination backpack and splash guard used by a bicycle rider for protecting the clothing on the back and the seat of the rider when the bicycle is in use, the combination comprising:

an outside waterproof back cover with adjustable shoulder straps and waist straps attached to said back cover;

a length adjustable and foldable waterproof splash guard cover attached to a bottom of said outside back cover and suspended therefrom, said splash guard cover having a length and a width sufficient for covering the seat of the bicycle rider; and attachment means for securing said splash guard cover to said back cover and for securing said splash guard cover to itself, whereby when said splash guard cover is folded and secured to said back cover and whereby when said splash guard cover is folded and secured to itself an outside storage pocket is formed thereon.

2. The combination as described in claim 1 further including an inside back cover attached to said outside back cover for forming an inside storage pocket therebetween.

3. The combination as described in claim 1 further including reflective material used to make said outside back cover and said splash guard cover for reflecting light from an approaching vehicle.

4. The combination as described in claim 1 further including reflective tape sewn on said outside back cover and said splash guard cover for reflecting light from an approaching vehicle.

5. The combination as described in claim 1 wherein said attachment means is a pair of hook and loop fasteners disposed along opposite sides of said splash guard cover and a pair of hook and loop fasteners disposed along opposite sides of said outside back cover.

6. The combination as described in claim 1 wherein said attachment means are zippers disposed along opposite sides of said splash guard cover and along opposite sides of said outside back cover.

7. A combination backpack and splash guard used by a bicycle rider for protecting the clothing of the back and the seat of the rider when the bicycle is in use, the combination comprising:

an outside water resistant back cover, said outside back cover sufficient in length and width to cover the back of the rider;

a pair of adjustable shoulder straps attached to said outside back cover;

a pair of adjustable waist straps attached to said outside back cover and said shoulder straps;

means for buckling together said waist straps;

a length adjustable and foldable waterproof splash guard cover attached to a bottom of said outside back cover and suspended therefrom, said splash guard cover having a length and a width sufficient for covering the seat of the bicycle rider; and attachment means for securing said splash guard cover to said back cover and for securing said splash guard cover to itself, whereby when said splash guard cover is folded and secured to said back cover and whereby when said splash guard cover is folded and secured to itself an outside storage pocket is formed thereon.

8. The combination as described in claim 7 further including an inside back cover made of light weight mesh material, said inside back cover attached to said outside back cover for forming an inside storage pocket therebetween.

9. The combination as described in claim 8 further including additional pockets formed in said outside back cover and disposed between said outside back cover and said inside back cover.

10. The combination as described in claim 8 wherein said attachment means is a pair of loop fasteners disposed along opposite sides of said splash guard cover and a pair of hook fasteners disposed along opposite sides of said outside back cover and across the top of the outside back cover to close the inside storage pocket.

11. The combination as described in claim 10 further including snap fasteners spaced along opposite sides of said splash guard cover and disposed along opposite sides of said outside back cover and on the top of said outside back cover.

12. The combination as described in claim 7 further including reflective strips used to attached to said outside back cover, said splash guard cover and said shoulder and waist straps for reflecting light from an approaching vehicle.

13. The combination as described in claim 7 further including reflective tape sewn on said outside back cover and said splash guard cover for reflecting light from an approaching vehicle.

14. A combination backpack and splash guard used by a bicycle rider for protecting the clothing of the back and the seat of the rider when the bicycle is in use, the combination comprising:

an outside waterproof back cover made of reflective material;

an inside back cover made of light weight mesh material, said inside back cover attached to said outside back cover for forming an inside storage pocket therebetween;

a pair of elastic shoulder straps attached to said outside back cover, said elastic shoulder straps attached to adjustable shoulder straps with light reflective strips;

a pair of adjustable waist straps with light reflective strips thereon, said waist straps attached to said outside back cover and said adjustable shoulder straps;

a buckle fastener attached to said waist straps for releasably buckling together said waist straps;

a length adjustable and foldable waterproof splash guard cover attached to a bottom of said outside back cover and suspended therefrom, said splash guard cover having a length in a range of 10 to 24 inches and a width in a range of 10 to 14 inches for covering the seat of the bicycle rider; and attachment means for securing said splash guard cover to said back cover and for securing said splash guard cover to itself, whereby when said splash guard cover is folded and secured to said back cover and whereby when said splash guard cover is folded and secured to itself an outside storage packet is formed thereon.

15. The combination as described in claim 14 further including additional pockets formed in said outside back cover and disposed between said outside back cover and said inside back cover.

16. The combination as described in claim 14 wherein said attachment means is a pair of loop fasteners disposed along opposite sides of said splash guard cover and a pair of hook fasteners disposed along opposite sides of said outside back cover.

17. The combination as described in claim 14 further including snap fasteners spaced along opposite sides of said splash guard cover and disposed along opposite sides of said outside back cover.

* * * * *